United States Patent [19]

Itakura

[11] Patent Number: 5,152,521
[45] Date of Patent: Oct. 6, 1992

[54] SHEET FEED MECHANISM

[75] Inventor: Toru Itakura, Kanagawa, Japan

[73] Assignee: Fuji Photo Film Co., Ltd., Kanagawa, Japan

[21] Appl. No.: 685,767

[22] Filed: Apr. 16, 1991

[30] Foreign Application Priority Data

| Apr. 20, 1990 [JP] | Japan | 2-105682 |
| Jun. 12, 1990 [JP] | Japan | 2-153782 |
| Jun. 12, 1990 [JP] | Japan | 2-153783 |

[51] Int. Cl.$^5$ ............................................. B65H 5/08
[52] U.S. Cl. ....................................... 271/11; 271/20; 271/104; 271/106
[58] Field of Search ............... 271/5, 10, 11, 14, 20, 271/84, 85, 121, 167, 104, 106, 267, 268

[56] References Cited

U.S. PATENT DOCUMENTS

| 3,025,052 | 3/1962 | Gutteling | 271/104 X |
| 3,861,668 | 1/1975 | Wood | 271/106 X |
| 4,371,158 | 2/1983 | Marx et al. | 271/106 X |
| 4,930,763 | 6/1990 | Horii et al. | 271/11 X |

FOREIGN PATENT DOCUMENTS

| 724246 | 8/1942 | Fed. Rep. of Germany | 271/106 |
| 1109188 | 6/1961 | Fed. Rep. of Germany | 271/106 |
| 2403469 | 9/1974 | Fed. Rep. of Germany | 271/106 |
| 0123829 | 9/1980 | Japan | 271/106 |
| 0136838 | 6/1986 | Japan | 271/106 |
| 0139834 | 6/1988 | Japan | 271/106 |
| 0242331 | 9/1989 | Japan | 271/5 |
| 255719 | 2/1949 | Switzerland | 271/106 |
| 1402394 | 6/1988 | U.S.S.R. | 271/106 |

Primary Examiner—H. Grant Skaggs
Assistant Examiner—Carol Lynn Druzbick
Attorney, Agent, or Firm—Sughrue, Mion, Zinn Macpeak & Seas

[57] ABSTRACT

A sheet feed mechanism feeds stimulable phosphor sheets, one by one, from a magazine to an image reading unit in an image reading apparatus. The sheet feed mechanism includes a suction mechanism having a plurality of suction cups for attracting a stimulable phosphor sheet in the magazine. The suction mechanism is movable toward and away from the magazine which stores a stack of stimulable phosphor sheets. A grip roller pair grips and guides a stimulable phosphor sheet, which has been taken out of the magazine by the suction cups, in a predetermined direction. One of the suction cups is supported on an angle which is angularly movable in response to engagement of the stimulable phosphor sheet attracted by the suction cups with the grip roller pair. Another angle, when engaged by the grip roller pair, guides a stimulable phosphor sheet, which has undesirably taken out of the magazine, back into the magazine. The sheet feed mechanism has a sheet identifying mechanism operatively coupled to the suction mechanism, for identifying the sheets from the magazine. The identifying means is movable with the suction mechanism toward the magazine, into a position facing an indicia of identifying information of the stimulable phosphor sheets.

9 Claims, 4 Drawing Sheets

SHEET FEED MECHANISM

BACKGROUND OF THE INVENTION

1. Field of the Invention

The present invention relates to a sheet feed mechanism, and more particularly to a sheet feed mechanism for reliably feeding sheets or sheet-like image recording mediums, such as photographic films, stimulable phosphor sheets, or the like, one by one from a magazine under a swinging action of suction cups that are coupled to a vacuum source, for holding the fed sheet or sheets so as to be ready for being further fed, and for identifying a sheet with an identifying means which is moved closely to the sheet in ganged relation to removal of the sheet.

2. Prior Art

There is known a stimulable phosphor which, when exposed to radiation such as X-rays, α-rays, β-rays, γ-rays, cathode rays, or ultraviolet rays, stores a part of the energy of the radiation. When the phosphor exposed to the radiation is subsequently exposed to stimulating rays such as visible light, the phosphor emits light in proportion to the stored energy of the radiation.

Various proposed radiation image recording and reading systems employ sheets of stimulable phosphor. In such a system, the radiation image information of an object such as a human body is recorded in a stimulable phosphor sheet, the stimulable phosphor sheet is then scanned with stimulating rays of light to emit light representing the recorded radiation image information, and then the emitted light is photoelectrically read to produce an image signal which is subsequently processed to reproduce a radiation image as a visible image on a recording medium such as a photographic photosensitive medium, a CRT, or the like.

The radiation image recorded on a stimulable phosphor sheet is read in the radiation image recording and reading system as follows:

The stimulable phosphor sheet is two-dimensionally scanned with a light beam such as a laser beam, and light emitted from the stimulable phosphor sheet in response to the application of the light beam is detected by a light detector such as a photomultiplier tube to produce timeseries image information. The two-dimensional scanning of the stimulable phosphor sheet with the light beam is normally effected by mechanically feeding the stimulable phosphor sheet in one direction for auxiliary scanning thereof while at the same time applying the light beam, which is cyclically deflected in a direction normal to the direction in which the stimulable phosphor sheet is fed, to the stimulable phosphor sheet for main scanning thereof.

The radiation image recording and reading system is basically composed of an image recording unit for recording a radiation image on a stimulable phosphor sheet, a sheet feeder for feeding the stimulable phosphor sheet along a predetermined path, an image reading unit disposed in the path and including a stimulating light source for emitting stimulating light rays to scan the stimulable phosphor sheet and a photoelectric reader for reading light emitted from the stimulable phosphor sheet upon application of the stimulating light rays to produce an image signal, and an erasing unit disposed in the path, for discharging any residual radiation energy from the stimulable phosphor sheet after the radiation image has been read therefrom in the image reading unit and before a new radiation image is recorded on the stimulable phosphor sheet in the image recording unit. The image recording unit, the sheet feeder, the image reading unit, and the erasing unit are assembled in one housing. A stack of stimulable phosphor sheets each bearing image information of objects is accommodated in a magazine, which is loaded in the system. The stimulable phosphor sheets are fed one by one from the magazine into the image reading unit by suction cups.

To each of the stimulable phosphor sheets, there is applied a bar code representative of an identification of the object whose image information is recorded on the stimulable phosphor sheet, image recording conditions, and other information.

Sometimes, a plurality of stimulable phosphor sheets may be fed at the same time by the suction cups, and hence stimulable phosphor sheets may not smoothly be fed one at a time to the image reading unit. In most cases, plural stimulable phosphor sheets are simultaneously fed because they stick electrostatically to each other.

One solution is to use a mechanism for enabling the suction cups to make a swinging action to separate stimulable phosphor sheets from each other when they stick together. Such a mechanism is very complex in structure if it is of a mechanical nature, or requires a complicated process if it is of an electrical nature. Therefore, the mechanism is considerably expensive to construct.

Another problem which arises when stimulable phosphor sheets are given a swinging action by the suction cups is that sticking stimulable phosphor sheets tend to fall from the stimulable phosphor sheet attracted to the suction cups into a position between the magazine and a feed roller or into a shutter slot defined in the magazine, with the result that a next stimulable phosphor sheet cannot smoothly be fed from the magazine. If the above trouble occurs, then it is necessary to take out the magazine, place the stimulable phosphor sheets which have fallen back into the magazine, and load the magazine back into place for further sheet feeding operation.

The system includes a bar-code reader for reading the information from the bar code of each stimulable phosphor sheet, and a feed mechanism for feeding stimulable phosphor sheets one by one from the magazine, the feed mechanism being independent of the bar-code reader. Actually, after the feed mechanism operates to feed a stimulable phosphor sheet from the magazine, the bar-code reader is reciprocally moved in a direction normal to the direction in which the bar code is scanned, thus reading the information from the bar code. Since a stimulable phosphor sheet is fed and its bar code is read in different processes, the cycle time required to complete the operation of the bar-code reader and the feed mechanism is long. Another drive source is needed to move the bar-code reader in reciprocating strokes. The system is therefore relatively large in size and expensive to manufacture.

SUMMARY OF THE INVENTION

It is an object of the present invention to provide a sheet feed mechanism which reliably feeds one sheet at a time from a magazine while preventing simultaneous feeding of plural sheets.

Another object of the present invention is to provide a sheet feed mechanism which includes means for guiding any sheets, which may have undesirably stuck to a sheet to be fed, back to a magazine.

Still another object of the present invention is to provide a sheet feed mechanism which incorporates a sheet identifying mechanism actuatable with the sheet feed mechanism for identifying a sheet that is fed from a magazine by the sheet feed mechanism.

According to the present invention, there is provided a sheet feed mechanism comprising a suction mechanism having a plurality of suction cups for attracting a sheet, the suction mechanism being movable toward and away from a magazine which stores a stack of sheets therein, feed means for guiding a sheet, which has been taken out of the magazine by the suction cups, in a predetermined direction, and a holder angularly movable in response to engagement of the sheet attracted by the suction cups with the feed means, one of the suction cups being mounted on the holder.

The sheet feed mechanism further includes a displaceable mechanism movable in a direction normal to directions in which the suction mechanism is movable toward and away from the magazine, the feed means being coupled to the displaceable mechanism. The displaceable mechanism comprises a rotative drive source and a link mechanism movable by the rotative drive source, the feed means being coupled to the link mechanism. The feed means comprises a pair of rollers, the arrangement being such that when one end of the sheet attracted by the suction cups is engaged by one of the rollers, the one of the suction cups is angularly moved by the holder to give a swinging action to the one end of the sheet. The holder comprises an angle and a spring for normally urging the angle to turn in one direction, the one of the suction cups being mounted on the angle.

According to the present invention, there is also provided a sheet feed mechanism comprising a suction mechanism having a plurality of suction cups for attracting a sheet, the suction mechanism being movable toward and away from a magazine which stores a stack of sheets therein, feed means for guiding a sheet, which has been taken out of the magazine by the suction cups, in a predetermined direction, and limiting means for guiding a sheet, which has undesirably taken out of the magazine, back into the magazine.

The limiting means comprises an angularly movable member and a resilient member for normally urging the angularly movable member away from a groove defined in the magazine, the angularly movable member being angularly movable into the magazine to close the groove against the bias of the resilient member in response to engagement with the feed means. The feed means is displaceable, the angularly movable member comprises an angle piece which is angularly movable into the magazine in engagement with a portion of the feed means when the feed means is displaced. The feed means comprises a pair of rollers and a pin disposed near one of the rollers, the arrangement being such that when the rollers disengage from the angle piece, the pin engages the angle piece to keep the angle piece in the magazine, closing the groove.

According to the present invention, there is further provided a sheet feed mechanism comprising a suction mechanism having a plurality of suction cups for attracting a sheet, the suction mechanism being movable toward and away from a magazine which stores a stack of sheets therein, and identifying means operatively coupled to the suction mechanism, for identifying the sheets from the magazine, the identifying means being movable with the suction mechanism toward the magazine, into a position facing an indicia of identifying information on the sheets.

The suction mechanism includes a support plate, the suction cups being supported on the support plate, the identifying means comprising a bar-code reader and a rotatable member, the indicia of identifying information comprising a bar code, the bar-code reader being displaceably mounted on the support plate by the rotatable member for movement toward the bar code on the sheets. The identifying means includes a plate operatively coupled to the support plate, and a plurality of rollers, the plate having opposite sides movably supported on the support plate by the rollers, the bar-code reader having a distal end movable toward the bar code by the rotatable member. The bar-code reader is displaceable due to gravity toward the bar code while being guided by the rollers.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
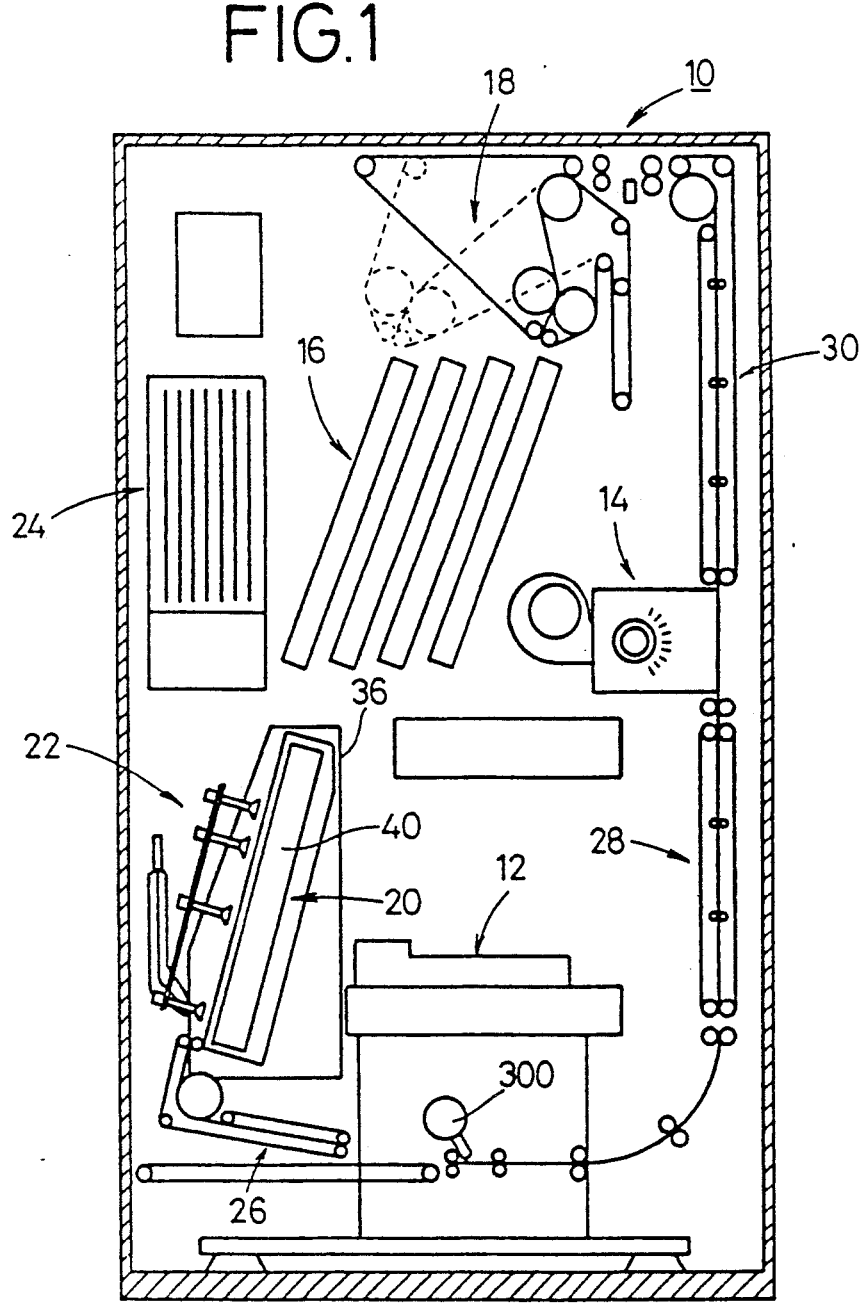
FIG. 1 is a schematic vertical cross-sectional view of a radiation image reading apparatus which includes a sheet feed mechanism according to the present invention.

As shown in FIG. 1, a radiation image reading apparatus 10 generally comprises an image reading unit 12 for reading a recorded radiation image from a stimulable phosphor sheet, an erasing unit 14 positioned downstream of the image reading unit 12, for erasing any residual radiation image from the stimulable phosphor sheet after the recorded radiation image has been read therefrom in the image reading unit 12, a sorter unit 18, position downstream of the erasing unit 14, for selectively feeding stimulable phosphor sheets of different sizes into a tray set 16, and a sheet feed unit 22 for feeding stimulable phosphor sheets one by one from a magazine 40 to the image reading unit 12. The sheet feed unit 22, the image reading unit 12, the erasing unit 14, and the sorter unit 18 are electrically controlled by a controller 24. The image reading unit 12 has a photomultiplier tube 300 for photoelectrically converting light into an electric signal.

The radiation reading apparatus 10 also includes a first feed system 26 disposed between the sheet feed unit 22 and the image reading unit 12, a second feed system 28 disposed between the image reading unit 12 and the erasing unit 14, and a third feed system 30 disposed between the erasing unit 14 and the sorter unit 18. Each of the first, second, and third feed systems 26, 28, 30 basically comprises rollers and belt conveyors trained around the rollers, with guide plates associated with the belt conveyors.

The sheet feed unit 22 comprises a sheet feed mechanism 20 according to the present invention. The sheet feed mechanism 20 will now be described below.

Figure 2:
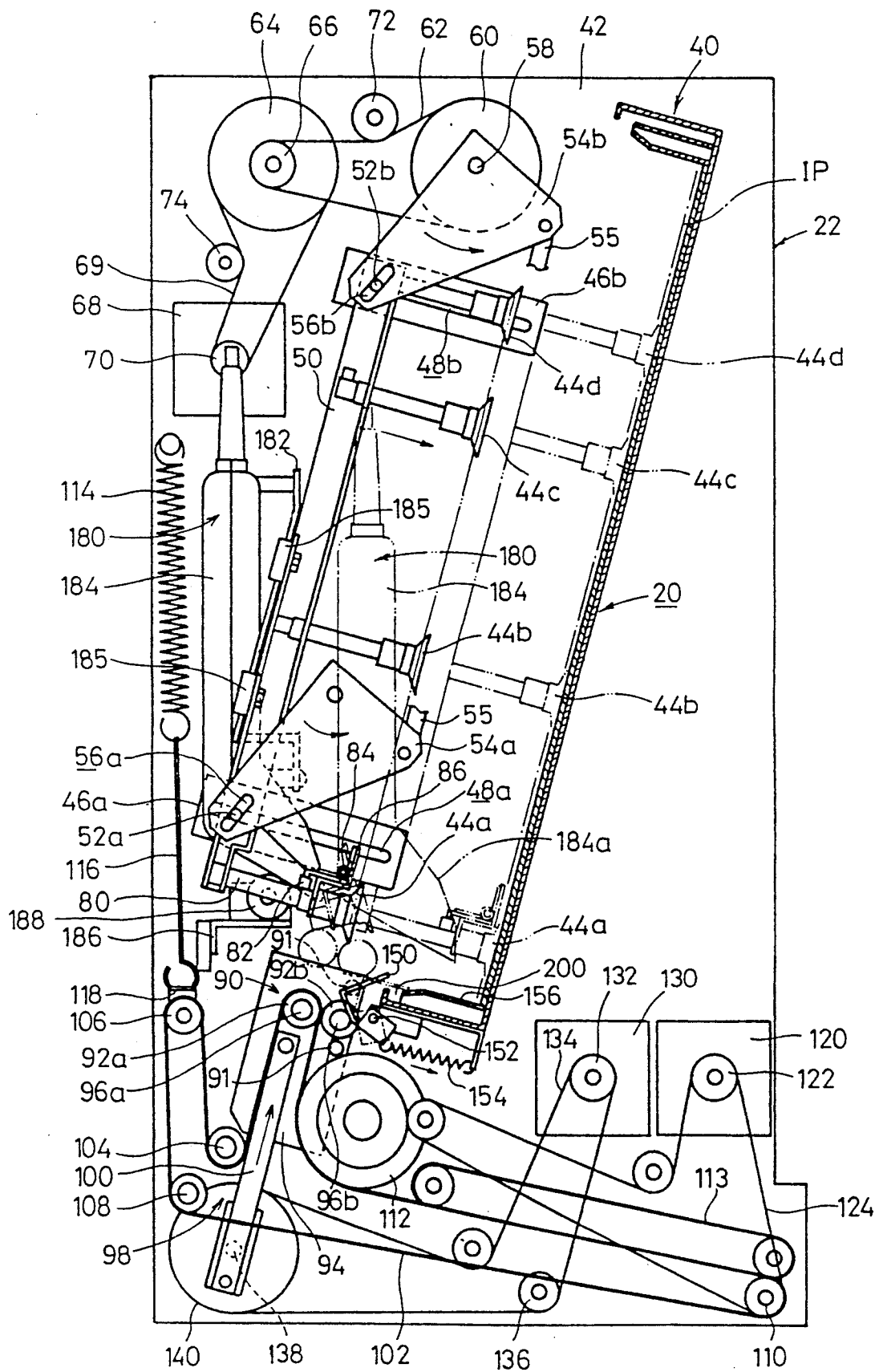
FIG. 2 is an enlarged vertical cross-sectional view of the sheet feed mechanism.

The sheet feed unit 22 has an inclined magazine receptacle 36 into which the magazine 40 is loaded in a direction normal to the sheet of FIG. 1. As shown in FIG. 2, the magazine 40 stores a stack of stimulable phosphor sheets IP therein. Two spaced guide plates 46a, 46b are disposed adjacent to an opening 42 defined in one side of the magazine 40. The guide plates 46a, 46b serve to guide a plurality of suction cups 44a, 44b, 44c, 44d when they are displaced into and out of the magazine 40 through the opening 42 in a direction normal to the longitudinal direction of the magazine 40.

The guide plates 46a, 46b have respective guide slots 48a, 48b which receive therein respective pins 52a, 52b that are supported on a support plate 50 at its opposite ends, the support plate 50 extending parallel to the magazine 40. The pins 52a, 52b are also disposed in respective slots 56a, 56b which are defined respectively in triangular swing members 54a, 54b. The swing members 54a, 54b are pivotally mounted on a support plate (not shown), and the swing member 54b has a shaft 58 coupled to and rotatable by a large-diameter pulley 60. The swing members 54a, 54b are operatively connected to each other by a rod 55.

The large-diameter pulley 60 is operatively connected to a small-diameter pulley 66 by a belt 62, the small-diameter pulley 66 being coaxially coupled to a large-diameter pulley 64. The large-diameter pulley 64 is rotatable by a stepping motor 68 through a belt 69 and a small-diameter pulley 70 which is coupled to the drive shaft of the stepping motor 68. Tension pulleys 72, 74 are rollingly held against the belts 62, 69, respectively.

The suction cup 44a, which is the lowest of all the suction cups 44a, 44b, 44c, 44d in FIG. 2, will be described below. The suction cup 44a is supported on one end of a cylindrical rod 80 mounted on the support plate 50. More specifically, a first angle 82 is mounted on the cylindrical rod 80, and a torsion spring 84 is attached to the first angle 82. The suction cup 44a is held on a second angle 86 which is fixed to one end of the torsion spring 84. A grip roller pair 90, which is displaceable in the direction indicated by the arrow, is disposed near an elevated position (indicated by the solid lines) of the second angle 86. The grip roller pair 90 comprises two rollers 92a, 92b rotatably supported on respective shafts 96a, 96b which are mounted on a guide plate 94. The guide plate 94 is displaceable in the direction indicated by the arrow by an angularly movable arm 100 of a link mechanism 98. A pin 91 is mounted on the guide plate 94 adjacent to the roller 92b.

The other suction cups 44b, 44c, 44d are also supported on respective cylindrical rods that are mounted on the support plate 50. The suction cups 44a through 44d are connected to a vacuum source (not shown).

A belt 102 is trained around the roller 92a and also small-diameter rollers 104, 106, 108, 110 and a large-diameter roller 112. The roller 106 is connected by a connector 118 to a rod 116 that engages one end of a coil spring 114. A belt 124 which is trained around a pulley 122 coupled to the drive shaft of a rotative drive source 120 is also trained around the pulley 110. When the rotative drive source 120 is energized, the pulley 122 is rotated, causing the belt 124 to rotate the roller 110 and hence the belt 102. The belt 102 includes a run held against a belt 113 between the rollers 110, 112.

The link mechanism 98 is actuated by a rotative drive source 130. More specifically, a belt 134 is trained around a pulley 132 coupled to the drive shaft of the rotative drive source 130, a pulley 136, and a pulley 140 whose shaft 138 is coupled to the link mechanism 98. Specifically, the arm 100 has one end coupled eccentrically to the pulley 140 so that the arm 110 can reciprocally move when the pulley 140 rotates about its shaft 138.

A bent angle piece 150 is disposed in the vicinity of the magazine 40, and can be angularly moved by a shaft 152. A coil spring 154 is connected to one end of the angle piece 150 for normally urging the angle piece 150 to turn counterclockwise about the shaft 152 under the bias of the coil spring 152 in the direction indicated by the arrow.

The angle piece 150 is positioned such that when the roller 92b of the grip roller pair 90 is displaced by the guide plate 94 in the direction indicated by the arrow, the shaft 96b of the roller 92b engages the angle piece 150. When the angle piece 150 is engaged by the shaft 96b of the roller 92b, the angle piece 150 is turned clockwise thereby against the bias of the coil spring 154, causing the tip end of the angle piece 150 into abutment against a slanted plate 156 which is disposed in the magazine 40. The magazine 40 has a groove 200 adjacent to the slanted plate 156 for receiving an end of a shutter (not shown) which closes the opening 42 of the magazine 40.

Figure 4:
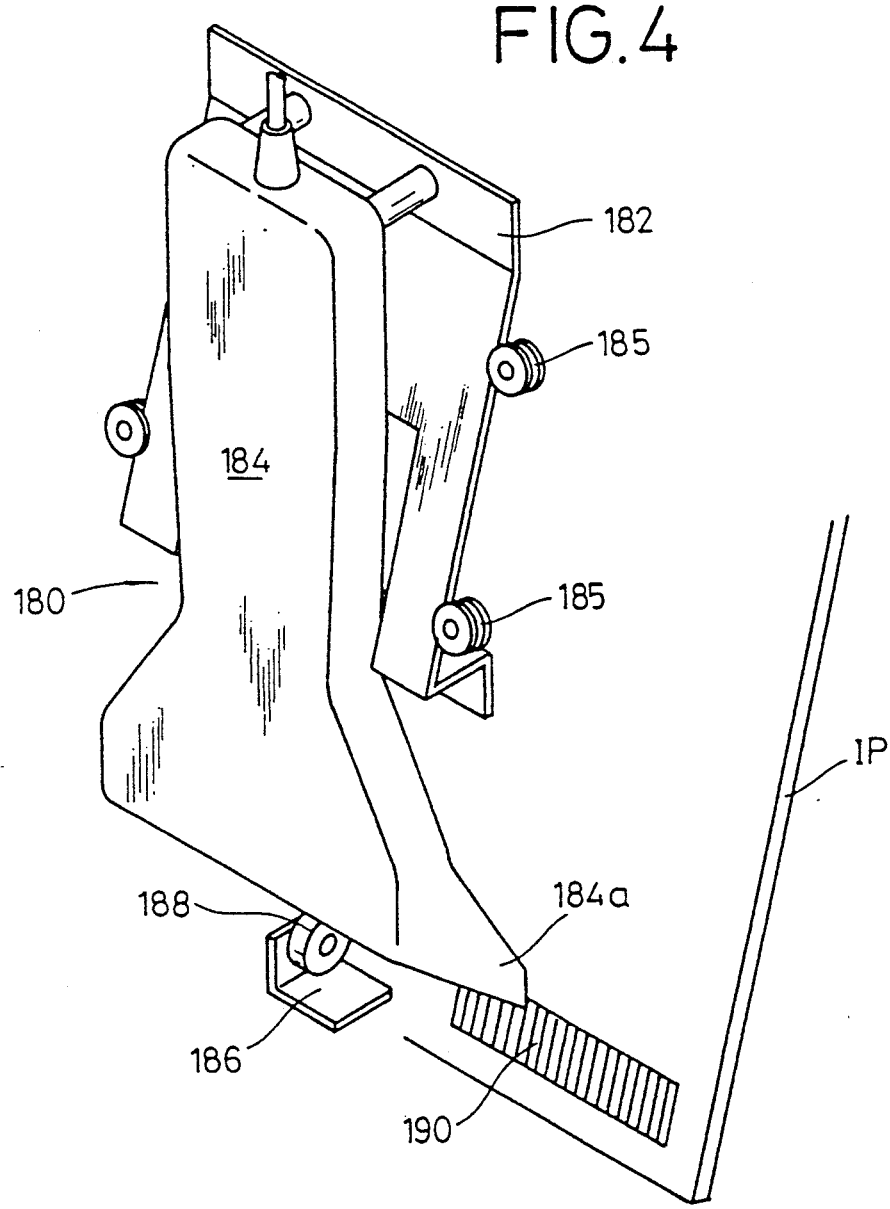
FIG. 4 is a perspective view of a sheet identifying mechanism incorporated in the sheet feed mechanism.

A sheet identifying mechanism 180 combined with the sheet feed mechanism 20 will be described below with reference to FIGS. 2 and 4. The sheet identifying mechanism 180 comprises a bar-code reader 184 fixedly mounted on a bent plate 182. A plurality of rollers 185 are rotatably supported on the support plate 50 and held in rolling engagement with opposite side edges of the plate 182, so that the bar-code reader 184 is movable along the support plate 50. The bar-code reader 184, which may be a commercially available bar-code reader, has a bent distal end 184a (see FIG. 4). The bar-code reader 184 is in a home position when no stimulable phosphor sheet is attracted by the suction cups 44a through 44d. In the home position, the bent distal end 184a of the bar-code reader 184 is held against a roller 188 which is rotatably supported on an angle 186.

The image reading apparatus 10 incorporating the sheet feed mechanism 20 is basically constructed as described above. Now, operation and advantages of the image reading apparatus 10 and the sheet feed mechanism 20 will be described below.

Figure 3A:
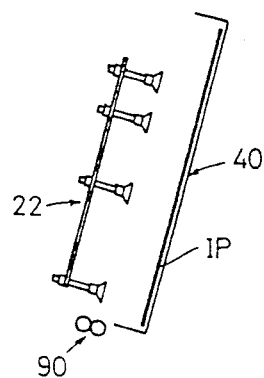
FIGS. 3a through 3l are side elevational views showing a progressive process of taking out and identifying a stimulable phosphor sheet while the stimulable phosphor sheet is given a swinging action by the sheet feed mechanism.
Figure 3B:
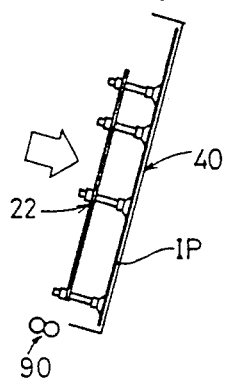

The magazine 40 with a plurality of stimulable phosphor sheets IP stacked therein is loaded into the magazine receptacle 36 in the direction normal to the sheets of FIGS. 1 and 2. A radiation image is recorded in each of the stacked stimulable phosphor sheets IP. At this time, the suction cups 44a through 44d and the grip roller pair 90 are in their home positions, as shown in FIG. 3a. In the home position, the grip roller pair 90 is positioned as indicated by the solid lines in FIG. 2. Then, the stepping motor 68 is energized to rotate the pulleys 64, 66, 60, causing the shaft 58 to angularly move the swing members 54a, 54b counterclockwise as indicated by the arrows. As a result, the support plate 50 is displaced toward the magazine 40 in the direction indicated by the arrow while being guided by the pins 52a, 52b and the guide slots 48a, 48b until the suction cups 44a through 44d supported on the support plate 50 are brought against the uppermost stimulable phosphor sheet IP in the magazine 40, as shown in FIG. 3b. The vacuum source connected to the suction cups 44a through 44d is now activated to produce a vacuum which enables the suction cups 44a through 44d to attract the uppermost stimulable phosphor sheet IP. When the support plate 50 is thus displaced toward the magazine 40, the distal end 184a of the bar-code reader 184 disengages from the roller 188, and falls due to gravity. The rollers 185 rotate, allowing the plate 182 to be displaced downwardly until finally the bar-code reader 184 reaches a position indicated by the broken lines in FIG. 2. In this position, the distal end 184a of the bar-code reader 184 faces a bar code 190 applied to a lower edge of the stimulable phosphor sheet IP, as shown in FIG. 4. At this time, the bar-code reader 184 is not yet actuated.

Figure 3C:
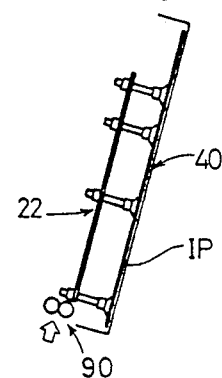

The rotative drive source 130 is then energized to cause the pulleys 136, 140 to rotate the shaft 138, moving the arm 100 of the link mechanism 98 in the direction indicated by the arrow. The guide plate 94 is displaced upwardly (FIG. 2) to elevate the grip roller pair 90 into a position indicated by the broken lines in FIG. 2. This position is shown in FIG. 3c. At this time, the shaft 96b of the roller 92b engages the angle piece 150, turning the angle piece 150 into a position indicated by the two-dot-and-dash lines in FIG. 2 against the tension of the coil spring 154. The angle piece 150 is brought against the upper end of the slanted plate 156, closing the shutter groove 200.

Figure 3D:
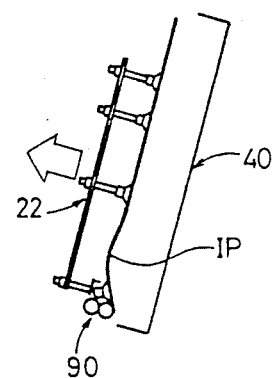

The stepping motor 68 is reversed to turn the swing members 54a, 54b clockwise, whereupon the suction cups 44a through 44d with the uppermost stimulable phosphor sheet IP attracted thereto are displaced back to the home position away from the magazine 40. A lower end of the attracted stimulable phosphor sheet IP is engaged by the grip roller pair 90, and the second angle 86 is turned to angularly displace the suction cup 44a as indicated by the broken lines in FIG. 2. Since the other suction cups 44b through 44d are holding the stimulable phosphor sheet IP in a substantially straight condition, the angular displacement of the suction cup 44a bends the lower end of the stimulable phosphor sheet IP, as if the stimulable phosphor sheet IP is given a swinging action, as shown in FIG. 3d. Therefore, even if successive lower stimulable phosphor sheets IP stick to the uppermost stimulable phosphor sheet IP under electrostatic forces, these lower stimulable phosphor sheets IP are caused to drop into the magazine 40 due to the bending of the lower end of the uppermost stimulable phosphor sheet IP. At this time, the angle piece 150 is engaged by the pin 91 near the roller 92b so as to remain in engagement with the upper end of the slanted plate 156, and hence the shutter groove 200 remains closed by the angle piece 150. Accordingly, the lower stimulable phosphor sheets IP do not enter the shutter groove 200. At the same time, the distal end 184a of the plate 184 is engaged by the roller 188, which is rotated by the plate 184 as the bar-code reader 184 is elevated back into the home position.

Figure 3E:
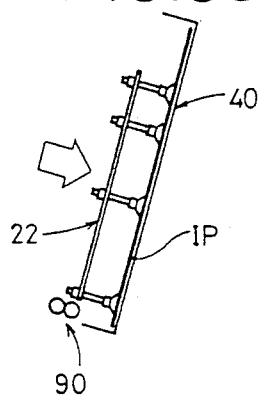
Figure 3F:
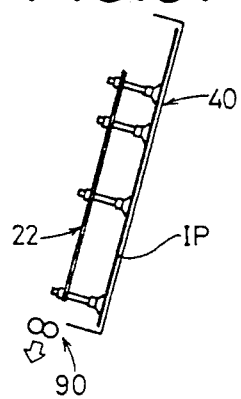
Figure 3G:
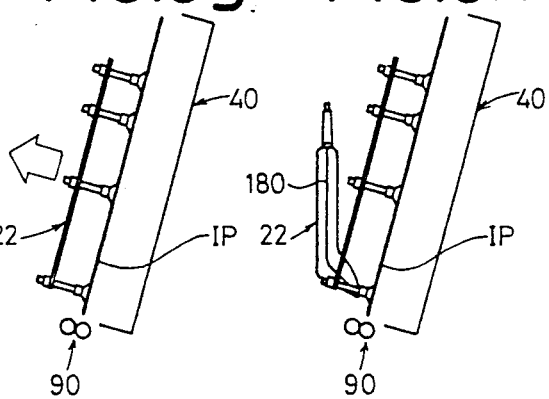
Figure 3H:
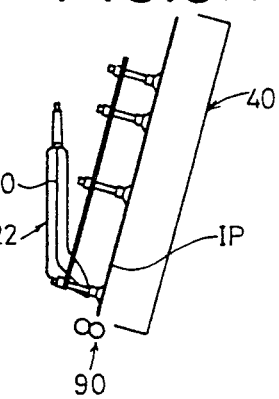

After only one stimulable phosphor sheet IP has thus been taken out of the magazine 40, the stepping motor 68 is energized again to rotate in its normal direction, bringing the uppermost stimulable phosphor sheet IP back into the magazine 40, as shown in FIG. 3e. The rotative drive source 130 is reversed to displace the grip roller pair 90 back to the home position, as shown in FIG. 3f. Then, the stepping motor 68 is reversed to lift the uppermost stimulable phosphor sheet IP out of the magazine 40, as shown in FIG. 3g. The bar-code reader 184 now reads the identification of the radiation image recorded on the stimulable phosphor sheet IP, the size of the stimulable phosphor sheet IP, and other information from the bar code 190, as shown in FIG. 3h. When the bar-code information is thus read, the lower distal end of the bar-code reader 184 is displaced with respect to the bar code 190. Specifically, while the uppermost stimulable phosphor sheet IP is being removed from the magazine 40, the bar-code reader 184 is displaced in a direction normal to the direction in which the bar-code reader 184 scans the bar code 190. Therefore, the bar code 190 is read reliably without error by the bar-code reader 184 even if the bar code 190 is somewhat blemished or otherwise damaged.

Figure 3I:
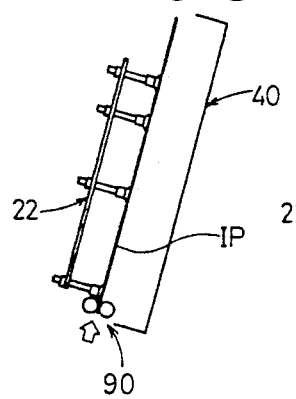

After the stimulable phosphor sheet IP has been identified by the bar-code reader 184, the rotative drive source 130 is energized to elevate the grip roller pair 90 to the broken-line position shown in FIG. 2. When the grip roller pair 90 reaches the highest position, the shaft 96b of the roller 92b disengages from the angle piece 150, but the pin 91 engages the angle piece 150. Therefore, the distal end of the angle piece 150 remains positioned in facing relation to the shutter groove 200. Now, the leading end of the stimulable phosphor sheet IP is gripped by the grip roller pair 90, i.e., sandwiched between the rollers 92a, 92b, as shown in FIG. 3i.

Figure 3J:
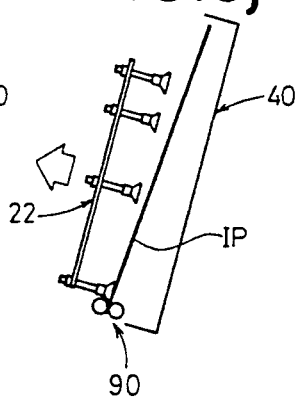
Figure 3K:
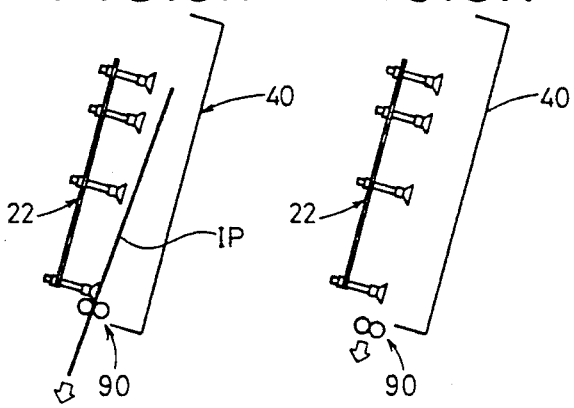
Figure 3L:
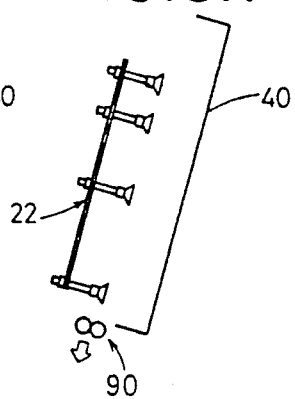

The vacuum source connected to the suction cups 44a through 44d is then inactivated to release the stimulable phosphor sheet IP from the suction cups 44a through 44d, which are further displaced upwardly away from the magazine 40, as shown in FIG. 3j. The stimulable phosphor sheet IP is then sandwiched between the roller 112 and the belt 102, and fed thereby into the first feed system 26, as shown in FIGS. 3k and 3l. The suction cups 44a through 44d and the bar-code reader 184 return to their home positions.

In order to allow the magazine 40 to be unloaded from the magazine receptacle 36, the grip roller pair 90 is lowered into the lowest position. More specifically, when the grip roller pair 90 is lowered, the pin 91 and the shaft 96b of the roller 92b disengage from the angle piece 150, which is turned back to the solid-line position in FIG. 2 under the tension of the coil spring 154. The distal end of the angle piece 150 is therefore displaced away from the shutter groove 200. The magazine 40 can now be unloaded from the magazine receptacle 36.

In the image reading unit 12, the stimulable phosphor sheet IP as it is fed therethrough is scanned in a main scanning direction, which is normal to the direction in which the stimulable phosphor sheet IP is fed, by a laser beam emitted from a laser beam source (not shown). The stimulable phosphor sheet IP is thus two-dimensionally scanned. Light, bearing the radiation image recorded in the stimulable phosphor sheet IP, is emitted from the stimulable phosphor sheet IP in response to the application of the laser beam, and converted into an electric signal by the photomultiplier tube 300 of the image reading unit 12. The electric signal thus produced is processed into a reproduced image which is recorded on an image recording medium, or displayed on a CRT, or stored in a memory.

The stimulable phosphor sheet IP from which the recorded radiation image has been read by the image reading unit 12 is then fed to the erasing unit 14 by the second feed system 28. In the erasing unit 14, an erasing light source is energized to apply erasing light to erase any residual radiation image from the stimulable phosphor sheet IP. The stimulable phosphor sheet IP is now rendered reusable. The reusable stimulable phosphor sheet IP is then fed to the sorter unit 18 by the third feed system 30, and directed by the sorter unit 18 into a tray in the tray set 16, which tray matches the size of the stimulable phosphor sheet IP.

As described above, when the uppermost stimulable phosphor sheet IP is fed from the magazine 40, one of the suction cups which is closest to the grip roller pair 90 is angularly moved to give a swinging action to, i.e., to bend the leading end, of the stimulable phosphor sheet IP. Therefore, any successive stimulable phosphor sheets which may have stuck to the uppermost stimulable phosphor sheet IP are caused to drop into the magazine 40, and only one stimulable phosphor sheet IP at a time is taken out of the magazine 40. The grip roller pair 90 as it is lifted angularly shifts the angle piece 150 into abutting engagement with the slanted plate 156 in the magazine 40, closing the shutter groove 200. Thus, any stimulable phosphor sheets which may have separated due to the swinging action given by the suction cup are prevented from dropping between the magazine 40 and the grip roller pair 90 or into the shutter groove 40. As a result, a next stimulable phosphor sheet IP can smoothly and reliably be fed from the magazine 40.

With the arrangement of the present invention, as described above, since one of the suction cups is angularly moved by the grip roller pair which feeds a sheet, a plurality of sheets are prevented from being simultaneously fed, by a relatively simple mechanism. The suction cup which is angularly moved is maintained in a constant attitude with respect to sheets, resulting in stable and reliable prevention of simultaneous feeding of plural sheets.

The grip roller pair when elevated actuates the angle to guide any sheets, which have been undesirably fed out of the magazine, desirably back into the magazine. Therefore, a next sheet can smoothly and reliably be fed from the magazine. Any sheets undesirably fed out of the magazine are thus prevented from dropping into an undesirable position, by a simple mechanism, and hence it would not be necessary to remove any sheets from such an undesirable position.

Since the angle is actuated in ganged relation to the grip roller pair, it does not interfere with the magazine as it is loaded into and unloaded from the sheet feed mechanism.

The sheet feed mechanism incorporates the sheet identifying mechanism such that the sheet identifying mechanism operates in ganged relation to the sheet feed mechanism. Since a sheet is fed by the sheet feed mechanism and identified by the sheet identifying mechanism substantially at the same time, the entire cycle time is relatively short. The sheet identifying mechanism is relatively simple in structure as it is actuated when the sheet feed mechanism is actuated, and requires no dedicated drive source. The sheet feed mechanism can be manufactured inexpensively and is less likely to fail because it is of a relatively simple mechanical structure.

Although a certain preferred embodiment has been shown and described, it should be understood that many changes and modifications may be made therein without departing from the scope of the appended claims.

What is claimed is:

1. A sheet feed mechanism comprising:
   a suction mechanism having a plurality of suction cups for attracting a sheet, said suction mechanism being movable toward and away from a magazine which stores a stack of sheets therein;
   feed means for guiding a sheet, which has been taken out of the magazine by said suction cups, in a predetermined direction;
   a holder angularly movable in response to engagement of said sheet attracted by said suction cups with said feed means; and
   one of said suction cups being mounted on said holder,
   wherein, when one end of the sheet attracted by said suction cups is engaged by said feed means, said one of the suction cups is angularly moved by said holder to give a swinging action to said one end of the sheet.

2. A sheet feed mechanism according to claim 1, further including a displaceable mechanism movable in a direction normal to directions in which said suction mechanism is movable toward and away from the magazine, said feed means being coupled to said displaceable mechanism.

3. A sheet feed mechanism according to claim 2, wherein said displaceable mechanism comprises a rotative drive source and a link mechanism movable by said rotative drive source, said feed means being coupled to said link mechanism.

4. A sheet feed mechanism according to claim 1 or 2, wherein said feed means comprises a pair of rollers, the arrangement being such that when one end of the sheet attracted by said suction cups is engaged by one of said rollers, said one of the suction cups is angularly moved by said holder to give a swinging action to said one end of the sheet.

5. A sheet feed mechanism according to claim 4, wherein said holder comprises an angle and a spring for normally urging said angle to turn in one direction, said one of the suction cups being mounted on said angle.

6. A sheet feed mechanism comprising:
   a suction mechanism having a plurality of suction cups for attracting a sheet, said suction mechanism being movable toward and away from a magazine which stores a stack of sheets therein;
   feed means for guiding a sheet, which has been taken out of the magazine by said suction cups, in a predetermined direction; and
   movable limiting means which is movable independently of and which selectively engages said magazine to guide a sheet, which has been undesirably taken out of the magazine, back into the magazine.

7. A sheet feed mechanism according to claim 6, wherein said limiting means comprises an angularly movable member and a resilient member for normally urging said angularly movable member away from a groove defined in the magazine, said angularly movable member being angularly movable into the magazine to close said groove against the bias of said resilient member in response to engagement with said feed means.

8. A sheet feed mechanism according to claim 7, wherein said feed means is displaceable, said angularly movable member comprises an angle piece which is angularly movable into the magazine by engagement with a portion of said feed means when the feed means is displaced.

9. A sheet feed mechanism according to claim 8, wherein said feed means comprises a pair of rollers and a pin disposed near one of said rollers, the arrangement being such that when said rollers disengage from said angle piece, said pin engages said angle piece to keep said angle piece in the magazine, closing said groove.

* * * * *